(12) United States Patent
Zheng et al.

(10) Patent No.: US 12,373,984 B2
(45) Date of Patent: Jul. 29, 2025

(54) MULTI-MODAL 3-D POSE ESTIMATION

(71) Applicant: Waymo LLC, Mountain View, CA (US)

(72) Inventors: Jingxiao Zheng, San Jose, CA (US); Xinwei Shi, Cupertino, CA (US); Alexander Gorban, Scotts Valley, CA (US); Junhua Mao, Palo Alto, CA (US); Andre Liang Cornman, San Francisco, CA (US); Yang Song, San Jose, CA (US); Ting Liu, Los Angeles, CA (US); Ruizhongtai Qi, Mountain View, CA (US); Yin Zhou, San Jose, CA (US); Congcong Li, Cupertino, CA (US); Dragomir Anguelov, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/614,254

(22) Filed: Mar. 22, 2024

(65) Prior Publication Data
US 2025/0037303 A1    Jan. 30, 2025

Related U.S. Application Data

(63) Continuation of application No. 17/505,900, filed on Oct. 20, 2021, now Pat. No. 11,967,103.
(Continued)

(51) Int. Cl.
*G06T 7/73* (2017.01)
*G06F 18/214* (2023.01)
(Continued)

(52) U.S. Cl.
CPC .............. *G06T 7/73* (2017.01); *G06F 18/214* (2023.01); *G06F 18/251* (2023.01); *G06V 20/58* (2022.01);
(Continued)

(58) Field of Classification Search
CPC .............. G06T 7/73; G06T 2207/10028; G06T 2207/30261; G06V 20/58
See application file for complete search history.

(56) References Cited

U.S. PATENT DOCUMENTS

| | | |
|---|---|---|
| 10,366,502 B1 | 7/2019 | Li |
| 10,408,939 B1 * | 9/2019 | Kim ........................ G06N 3/08 |

(Continued)

OTHER PUBLICATIONS

Akhter et al., "Pose-conditioned joint angle limits for 3d human pose reconstruction," Proceedings of the IEEE Conference on Computer Vision and Pattern Recognition, 2015, pp. 1446-1455.
(Continued)

*Primary Examiner* — Myron Wyche
(74) *Attorney, Agent, or Firm* — Fish & Richardson P.C.

(57) ABSTRACT

Methods, systems, and apparatus, including computer programs encoded on a computer storage medium, for estimating a 3-D pose of an object of interest from image and point cloud data. In one aspect, a method includes obtaining an image of an environment; obtaining a point cloud of a three-dimensional region of the environment; generating a fused representation of the image and the point cloud; and processing the fused representation using a pose estimation neural network and in accordance with current values of a plurality of pose estimation network parameters to generate a pose estimation network output that specifies, for each of multiple keypoints, a respective estimated position in the three-dimensional region of the environment.

20 Claims, 7 Drawing Sheets

Related U.S. Application Data

(60) Provisional application No. 63/114,448, filed on Nov. 16, 2020.

(51) Int. Cl.
  G06F 18/25 (2023.01)
  G06V 20/58 (2022.01)

(52) U.S. Cl.
  CPC .............. *G06T 2207/10028* (2013.01); *G06T 2207/20081* (2013.01); *G06T 2207/20084* (2013.01); *G06T 2207/30196* (2013.01); *G06T 2207/30261* (2013.01)

(56) References Cited

U.S. PATENT DOCUMENTS

| | | | |
|---|---|---|---|
| 2018/0348374 A1* | 12/2018 | Laddha | G01S 17/931 |
| 2019/0108651 A1* | 4/2019 | Gu | G06V 10/955 |
| 2020/0005485 A1 | 1/2020 | Xu et al. | |
| 2020/0057442 A1 | 2/2020 | Deiters et al. | |
| 2020/0184721 A1 | 6/2020 | Ge et al. | |
| 2020/0302160 A1* | 9/2020 | Hashimoto | G06T 7/73 |
| 2021/0166150 A1 | 6/2021 | Wang et al. | |
| 2022/0043441 A1* | 2/2022 | Huang | H04L 63/123 |
| 2022/0343639 A1* | 10/2022 | Li | G06N 3/08 |

OTHER PUBLICATIONS

Bin et al., "Simple baselines for human pose estimation and tracking," Proceedings of the European conference on computer vision, 2018, pp. 466-481.
Chen et al., "3d human pose estimation=2d pose estimation+matching," Proceedings of the IEEE Conference on Computer Vision and Pattern Recognition, 2017, pp. 5759-5767.
Chen et al., "Unsupervised 3d pose estimation with geometric self-supervision," Proceedings of the IEEE/CVF Conference on Computer Vision and Pattern Recognition, 2019, pp. 5707-5717.
Extended Search Report in European Appln. No. 21892516.2, dated Sep. 9, 2024, 14 pages.
Furst et al., "HPERL: 3d human pose estimation from RGB and LiDAR," 2020 25th International Conference on Pattern Recognition, May 2021, 7 pages.
Ge et al., "Hand pointnet: 3d hand pose estimation using point sets," Proceedings of the IEEE Conference on Computer Vision and Pattern Recognition, 2018, pp. 8417-8426.
Ge et al., "Point-to-point regression pointnet for 3D hand pose estimation," Proceedings of the European Conference on Computer Vision, 2018, pp. 475-491.
International Search Report and Written Opinion in International Appln. No. PCT/US2021/049838, dated Dec. 24, 2021, 10 pages.
Kim et al., "PedX: Benchmark Dataset for Metric 3D Pose Estimation of Pedestrians in Complex Urban Intersections," CoRR, Sep. 10, 2018, arXiv:1809.03605v1, 8 pages.
Kocabas et al., "Self-supervised learning of 3d human pose using multi-view geometry," Proceedings of the IEEE/CVF Conference on Computer Vision and Pattern Recognition, 2019, pp. 1077-1086.
Qi et al., "Frustum pointnets for 3d object detection from RGB-D data," Proceedings of the IEEE Conference on Computer Vision and Pattern Recognition, Jun. 2018, pp. 918-927.
Sun et al., "Deep high-resolution representation learning for human pose estimation," Proceedings of the IEEE conference on computer vision and pattern recognition, 2019, pp. 5693-5703.
Sun et al., "Integral Human Pose Regression," CoRR, Sep. 18, 2018, arXiv:1711.08229v4, 17 pages.
Tripathi et al., "Posenet3d: Unsupervised 3D human shape and pose estimation," eprint arXiv:2003.03473, Mar. 2020, 17 pages.
Vora et al., "PointPainting: Sequential Fusion for 3D Object Detection," CoRR, Nov. 22, 2019, arXiv:1911.10150v2, 11 pages.
Zhang et al., "Weakly supervised adversarial learning for 3d human pose estimation from point clouds," IEEE Transactions on Visualization and Computer Graphics, May 2020, 26(5):1851-1859.
Zheng et al., "Deep learning-based human pose estimation: A survey," CoRR, Dec. 2020, arxiv.org/abs/2012.13392, 25 pages.
Zhou et al., "Towards 3D Human Pose Estimation in the Wild: A Weakly-Supervised Approach," 2017 IEEE International Conference on Computer Vision (ICCV), Oct. 22, 2017, pp. 398-407.
Zhou et al., "Towards 3d human pose estimation in the wild: A weakly-supervised approach," Proceedings of the IEEE International Conference on Computer Vision, Oct. 2017, 10 pages.
Zimmermann et al., "3D Human Pose Estimation in RGBD Images for Robotic Task Learning," CoRR, Mar. 13, 2018, arXiv:1803.02622v2, 7 pages.

* cited by examiner

MULTI-MODAL 3-D POSE ESTIMATION

CROSS-REFERENCE TO RELATED APPLICATION

This is a continuation of U.S. application Ser. No. 17/505,900, filed on Oct. 20, 2021, which claims priority to U.S. Provisional Application No. 63/114,448, filed on Nov. 16, 2020. The disclosure of the prior applications are considered part of and are incorporated by reference in the disclosure of this application.

BACKGROUND

This specification relates to autonomous vehicles.

Autonomous vehicles include self-driving cars, boats, and aircraft. Autonomous vehicles use a variety of on-board sensors and computer systems to detect nearby objects and their respective characteristics (position, shape, heading, speed, etc.) and use such detections to make control and navigation decisions.

Some autonomous vehicles have computer systems that implement neural networks for object detection or classification within sensor data.

A machine learning model receives input and generates an output based on the received input and on values of the parameters of the model. For example, machine learning models may receive an image and generate a score for each of a set of classes, with the score for a given class representing a probability that the image contains an image of an object that belongs to the class.

The machine learning model may be composed of, e.g., a single level of linear or non-linear operations or may be a deep network, i.e., a machine learning model that is composed of multiple levels, one or more of which may be layers of non-linear operations. An example of a deep network is a neural network with one or more hidden layers.

SUMMARY

This specification describes how an on-board system of a vehicle, e.g. an autonomous or semi-autonomous vehicle, can implement a neural network to estimate the pose of objects characterized by sensor data including two-dimensional image data and three-dimensional point cloud data. A pose of an object refers to the position, orientation, or both of the object with reference to a predefined coordinate frame, e.g., vehicle coordinate frame. For example, the system can generate as the network output a pose vector that includes an estimated location in the three-dimensional (3-D) point cloud of each of a predetermined number of body joints of the object.

According to an aspect, there is provided a computer-implemented method comprising: obtaining an image of an environment; obtaining a point cloud of a three-dimensional region of the environment; generating a fused representation of the image and the point cloud, comprising: processing the image to generate a heatmap representation that, for each of a plurality of keypoints, assigns a respective score to each of a plurality of locations in the image that represents a likelihood that the keypoint is located at the location in the image; generating, for each of a plurality of data points in the point cloud, a respective feature vector that includes the respective scores for each of the plurality of keypoints for the location in the image that corresponds to the data point; and generating the fused representation from the respective feature vectors; and processing the fused representation using a pose estimation neural network and in accordance with current values of a plurality of pose estimation network parameters to generate a pose estimation network output that specifies, for each of the plurality of keypoints, a respective estimated position in the three-dimensional region of the environment.

Generating the respective feature vector may comprise projecting each of the plurality of data points in the point cloud onto an image coordinate frame.

Specifying, for each of the plurality of keypoints, a respective estimated position in the three-dimensional region of the environment may comprise generating a three-dimensional location for each of the plurality of keypoints with reference to a point cloud coordinate frame.

The environment may be an environment in a vicinity of a vehicle; and the respective portions of the three-dimensional region in the environment assigned to the plurality of keypoints may collectively define a respective estimated pose of one or more pedestrians in the environment.

Generating the fused representation from the respective feature vectors may comprise computing a concatenation of the each feature vector and a vector specifying the three-dimensional location of a corresponding data point.

The method may further comprise training the pose estimation neural network that has the plurality of pose estimation network parameters, wherein the training may comprise: obtaining first training data comprising a labeled image associated with a label that specifies a plurality of ground truth keypoint locations in the image; obtaining second training data comprising an unlabeled point cloud; generating, for the unlabeled point cloud and based on the plurality of ground truth keypoint locations in the labeled image, a first pseudo label that specifies a plurality of pseudo keypoint locations in the unlabeled point cloud; and training the pose estimation neural network by using the first pseudo label as target pose estimation network output.

The training may comprise, for the unlabeled point cloud: processing, using the pose estimation neural network and in accordance with current values of the plurality of pose estimation network parameters, the fused representation to generate a training pose estimation network output that assigns a plurality of predicted keypoints to the unlabeled point cloud; computing a first loss based on a difference between the target pose estimation network output and the training pose estimation network output; determining, based on computing a gradient of the first loss with respect to the pose estimation network parameters, an update to the current values of the pose estimation network parameters.

The first loss may be a Huber loss or a mean squared error loss.

The pose estimation neural network may comprise: a first sub network configured to receive the fused representation and to process the fused representation to generate an intermediate representation of the fused representation; and a second sub network configured to receive the intermediate representation and to process the intermediate representation to generate the pose estimation network output.

The method may further comprise: generating, for the point cloud and based on the plurality of ground truth keypoint locations in the image, a second pseudo label that specifies a pseudo classification for each of the plurality of data points in the point cloud, wherein the pseudo classification specifies whether a corresponding data point should be classified as a keypoint or not; and training the first sub network and a data point classification neural network by using the pseudo classifications as target data point classification network outputs, the data point classification neural network having a plurality of data point classification network parameters and configured receive the intermediate representation generated by the first sub network of the pose estimation neural network and to process the intermediate representation to generate a data point classification network output that specifies a predicted classification for each of the plurality of data points in the point cloud.

The training may further comprise: processing, using the data point classification neural network and in accordance with current values of the data point classification network parameters, the intermediate representation to generate the training data point classification network output; computing a second loss based on a difference between the target data point classification network output and the training data point classification network output; based on computing a gradient of the second loss with respect to the data point classification network parameters and backpropagating the gradient of the second loss through the data point classification network parameters into network parameters of the first sub network, an update to the current values of the first sub network parameters.

The method may further comprise determining an update to the current values of the data point classification network parameters.

The second loss may be a sigmoid loss.

Generating the first pseudo label that specifies a plurality of pseudo keypoint locations in the point cloud may comprise: projecting the plurality of data points in the point cloud onto the image coordinate frame; identifying a subset of the plurality of projected data points that are within a predetermined distance of each of one or more of the plurality of ground truth keypoint locations in the image.

According to another aspect, there is provided a system comprising one or more computers and one or more storage devices storing instructions that are operable, when executed by the one or more computers, to cause the one or more computers to perform the operations of the above method aspect.

According to a further aspect, there is provided a computer storage medium encoded with instructions that, when executed by one or more computers, cause the one or more computers to perform the operations of the method aspect.

It will be appreciated that features described in the context of one aspect may be combined with features described in the context of another aspect.

Particular embodiments of the subject matter described in this specification can be implemented so as to realize one or more of the following advantages.

An autonomous or semi-autonomous vehicle system can use a neural network to process data from different kinds of sensors, i.e., LIDAR and cameras, and to combine information derived from the different sensors to improve overall performance in 3-D pose estimation of objects of interest, e.g., pedestrians, cyclists, or other vehicles, i.e., to more accurately generate network outputs which define respective estimated poses of the objects. Better-informed planning decisions can then be generated based on the pose estimations in order to cause the vehicle to travel along a safe and comfortable trajectory.

Labeled training data that includes LIDAR point clouds and corresponding human-assigned labels (e.g., keypoints) has been utilized in training such neural networks. However, generating such labeled point cloud training data can be expensive, both in terms of the labor cost relating to the time-consuming labeling process performed by human reviewers as well as the consumption of computational and/or network resources during the labeling process. When labelling of thousands or millions of point clouds are considered, the time required for the manual labeling process and, the corresponding cost associated with it can both be significant. Moreover, the human-assigned labels can include errors, e.g., misplaced keypoints within a point cloud.

This specification, however, describes training techniques that overcome the aforementioned drawbacks. In particular, the disclosed techniques allow for a training system to generate training data that includes automatically-assigned labels to point clouds and thereafter train the neural network jointly with a data point classification neural network on the training data.

By using the disclosed synthetic label generation techniques, the training system can generate labeled point cloud training data in massive volumes by automatically assigning pseudo labels to 3-D point clouds based on information derived from corresponding labeled two-dimensional (2-D) images, which are generally more easily obtainable at lower costs, higher qualities, or both. During training, the multi-task training techniques provide a first neural network in the neural network with richer training signals that come from a related auxiliary task, i.e., pointwise classification of the point cloud, and therefore allow the first neural network to learn to generate a rich and robust intermediate representation of the network input. Such intermediate representation further enables a second neural network in the neural network to better perform related tasks that share this intermediate representation, including assigning 3-D keypoints to the point clouds. In this manner, the disclosed techniques can lead to improved pose estimation accuracy and training efficiency of the neural networks.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes how an on-board system of a vehicle, e.g. an autonomous or semi-autonomous vehicle, can implement a neural network to estimate the pose of objects characterized by three-dimensional point cloud data.

Figure 1:
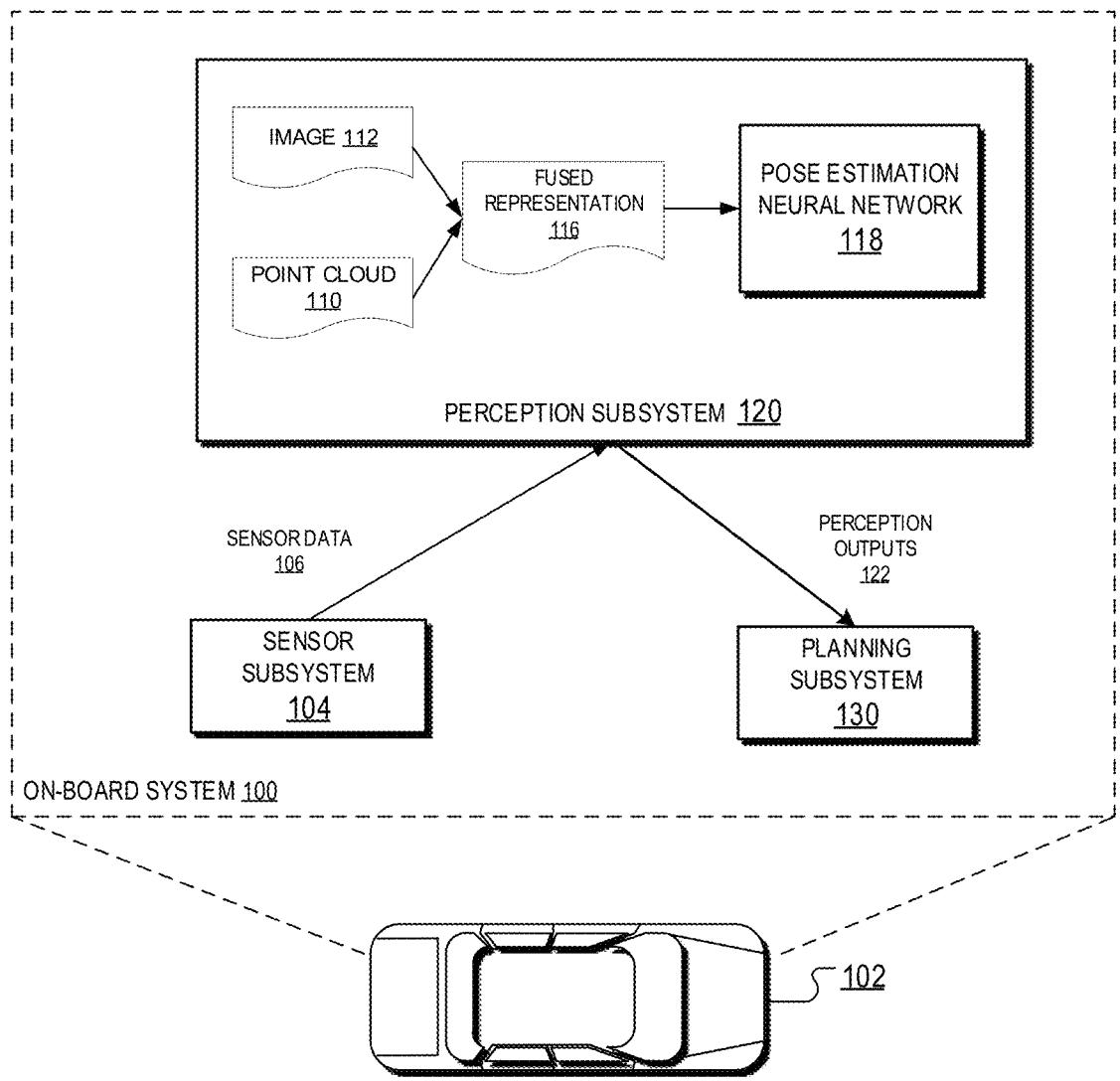
FIG. 1 is a block diagram of an example on-board system.

FIG. 1 is a block diagram of an example on-board system 100. The on-board system 100 is physically located on-board a vehicle 102. The vehicle 102 in FIG. 1 is illustrated as an automobile, but the on-board system 100 can be located on-board any appropriate vehicle type. The vehicle 102 can be a fully autonomous vehicle that makes fully-autonomous driving decisions or a semi-autonomous vehicle that aids a human operator. For example, the vehicle 102 can autonomously apply the brakes if a full-vehicle prediction indicates that a human driver is about to collide with a detected object, e.g., a pedestrian, a cyclist, or another vehicle. While the vehicle 102 is illustrated in FIG. 1 as being an automobile, the vehicle 102 can be any appropriate vehicle that uses sensor data to make fully-autonomous or semi-autonomous operation decisions. For example, the vehicle 102 can be a watercraft or an aircraft. Moreover, the on-board system 100 can include components additional to those depicted in FIG. 1 (e.g., a control subsystem or a user interface subsystem).

The on-board system 100 includes a sensor subsystem 104 which enables the on-board system 100 to "see" the environment in a vicinity of the vehicle 102. The sensor subsystem 104 includes one or more sensors, some of which are configured to receive reflections of electromagnetic radiation from the environment in the vicinity of the vehicle 102. For example, the sensor subsystem 104 can include one or more laser sensors (e.g., LIDAR sensors) that are configured to detect reflections of laser light. As another example, the sensor subsystem 104 can include one or more radar sensors that are configured to detect reflections of radio waves. As another example, the sensor subsystem 104 can include one or more camera sensors that are configured to detect reflections of visible light.

The sensor subsystem 104 repeatedly (i.e., at each of multiple time points) uses raw sensor measurements, data derived from raw sensor measurements, or both to generate sensor data 106. The raw sensor measurements indicate the directions, intensities, and distances travelled by reflected radiation. For example, a sensor in the sensor subsystem 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

In particular, the sensor data 106 includes point cloud data and image data that characterizes the latest state of an environment (i.e., an environment at the current time point) in the vicinity of the vehicle 102. For example, the point cloud data can be generated by using one or more LIDAR sensors or depth camera sensors of the sensor subsystem 104, while the image data can be generated by using one or more camera sensors of the sensor subsystem 104.

A point cloud is a collection of data points defined by a given coordinate frame, e.g., a three-dimensional coordinate frame. For example, in the three-dimensional coordinate frame, a point cloud can define the shape of some real or synthetic physical object. In this specification, for convenience, a "point cloud" will refer to a three-dimensional point cloud, i.e., each point in the point cloud is defined by three values representing respective coordinates in the coordinate frame, e.g., (x, y, z) coordinates. But in general, a point cloud can have a different dimensionality. For example, in the three-dimensional coordinate frame, each point in the point cloud can be defined by more than three values, wherein three values represent coordinates in the coordinate frame and the additional values each represent a property of the point of the point cloud, e.g., an intensity of the point in the point cloud.

The on-board system 100 can provide the sensor data 106 generated by the sensor subsystem 104 to a perception subsystem 120 for use in generating perception outputs 122 that can characterize the environment, objects that are present the environment, or both in the vicinity of the vehicle 102. The objects in the vicinity of the vehicle 102 can be, for example, pedestrians, bicyclists, or other vehicles. When provided to the planning subsystem 130 of the system 100, such perception outputs 122 generally facilitate the generation of timely and accurate planning decisions which cause the vehicle 102 to travel along a safe and comfortable trajectory.

In particular, the perception outputs 112 includes data specifying estimated poses of objects in the sensor data 106. In other words, the perception outputs 112 include data specifying a plurality of keypoint locations that point to, i.e., correspond to the locations of, points of interest on objects in the environment. For example, the keypoint locations can point to joints of objects in the environment or point to points on surfaces of objects that are depicted in the sensor data 106.

To this end, the perception subsystem 120 implements a pose estimation neural network 118 that is configured through training to estimate the pose of objects by processing a fused representation 116 of a point cloud 110 and an image 112 and to generate a pose estimation network output, e.g., in form of vectors or matrixes, that specifies an estimated 3-D location in the point cloud 110 of each of multiple keypoints. In other words, the pose estimation network output includes information that assigns, to each of the multiple keypoints, a respective portion of a 3-D region in the environment. For example, the pose estimation network output can define regressed (x, y, z) coordinates (or coordinates in a different coordinate system) for each keypoint.

Figure 5:
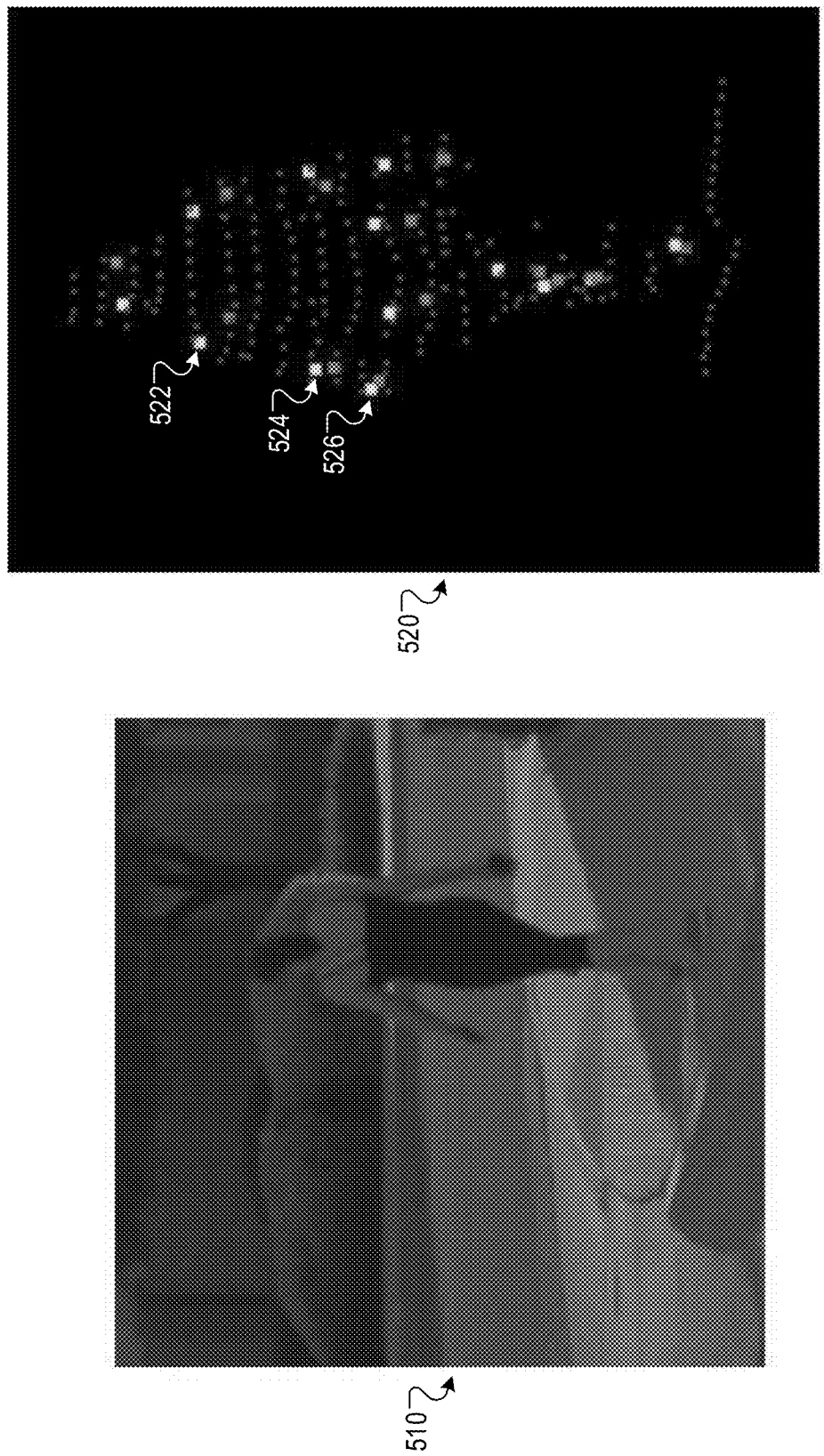
FIG. 5 illustrates an example pose estimation network output.

FIG. 5 illustrates an example pose estimation network output for an input point cloud 520 and a corresponding camera image 510 showing a same scene in the environment characterized by the point cloud. As illustrated, the example pose estimation network output in FIG. 5 specifies an estimated location in the point cloud of each of a predetermined number of body joints, e.g., body joints 522, 524, and 526, that collectively define the pose and the orientation of a human body shown in the point cloud.

To generate the fused representation 116, the system can generate a heatmap representation of the image 112 by using another, already trained heatmap generation neural network, i.e., a network that has been trained to generate heatmap representations from input images. Examples of suitable heatmap generation neural networks and techniques for training the networks are described in more detail at Sun, Ke, et al. "Deep high-resolution representation learning for human pose estimation." Proceedings of the IEEE conference on computer vision and pattern recognition. 2019, and at Xiao, Bin, Haiping Wu, and Yichen Wei. "Simple baselines for human pose estimation and tracking." Proceedings of the European conference on computer vision (ECCV). 2018. The heatmap representation, which generally includes object pose information extracted or derived from the image by using the heatmap generation neural network, is then combined with information contained in a corresponding point cloud 110 paired with the image to generate the fused representation 116 to be provided as input to the pose estimation neural network 118.

The fused representation 116, also referred to as a multi-modal feature representation, can be in form of a vector or a matrix of numeric values and can be a shared representation of object pose information derived from the camera image and data point location information contained in the point cloud.

The pose estimation neural network 118 is configured to process the fused representation 116 in accordance with trained values of the parameters of the neural network (referred to as "pose estimation network parameters") to generate the pose estimation network output. An example architecture of the pose estimation neural network 118 and techniques for training the pose estimation neural network 118 will be described in more detail below with reference to FIGS. 2 and 4.

When the planning subsystem 130 receives the perception outputs 122, the planning subsystem 130 can use the perception outputs 122 to generate planning decisions which plan the future trajectory of the vehicle 102. The planning decisions generated by the planning subsystem 130 can include, for example: yielding (e.g., to pedestrians), stopping (e.g., at a "Stop" sign), passing other vehicles, adjusting vehicle lane position to accommodate a bicyclist, slowing down in a school or construction zone, merging (e.g., onto a highway), and parking. The planning decisions generated by the planning subsystem 130 can be provided to a control of the vehicle 102. The control system of the vehicle can control some or all of the operations of the vehicle by implementing the planning decisions generated by the planning system. For example, in response to receiving a planning decision to apply the brakes of the vehicle, the control system of the vehicle 102 may transmit an electronic signal to a braking control unit of the vehicle. In response to receiving the electronic signal, the braking control unit can mechanically apply the brakes of the vehicle.

While the pose estimation neural network 118 is described as being implemented on-board a vehicle, the network 118 and the components that generate the inputs to the network 118 can generally be implemented as computer programs on any system of one or more computers in one or more locations and the outputs generated by the network 118 can be used for any appropriate purpose, e.g., in machine vision and/or robotics tasks.

Figure 2:
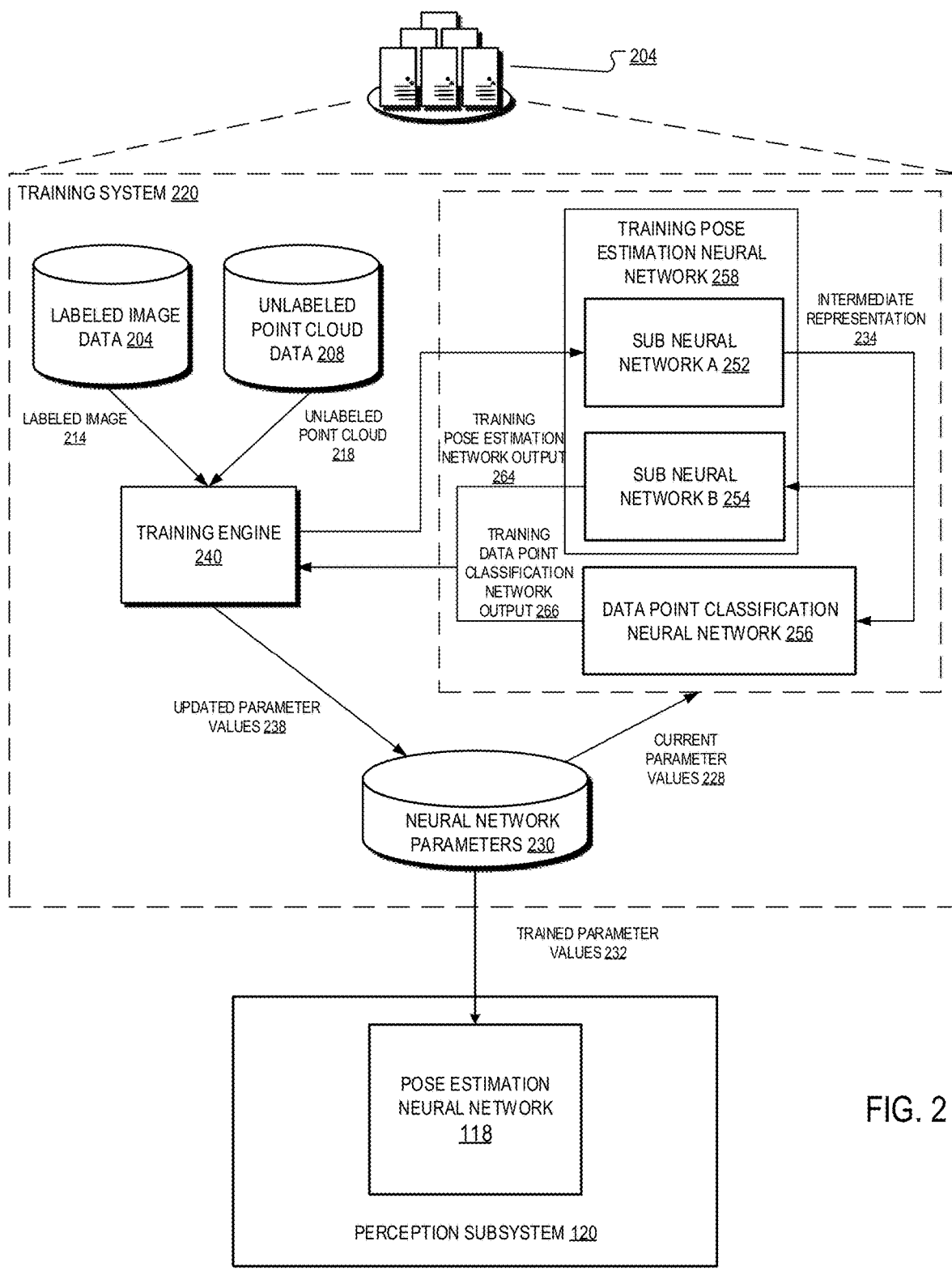
FIG. 2 is a block diagram of an example training system.

FIG. 2 shows an example training system 220. The training system 220 is an example of a system implemented as computer programs on one or more computers in one or more locations in which the systems, components, and techniques described below are implemented.

To allow the perception subsystem 120 to accurately estimate poses of objects in the sensor data 106, the training system 220 can determine trained values of a set of network parameters 230 of the pose estimation neural network 118 included in the perception subsystem 120. While the perception subsystem 120 may be implemented on-board a vehicle as described above, the training system 220 is typically hosted within a data center 204, which can be a distributed computing system having hundreds or thousands of computers in one or more locations.

The training system 220 includes a training pose estimation neural network 258 that is configured to process a network input including a fused representation of a point cloud and an image that each characterize a scene of an environment and to generate a training pose estimation network output 264 that specifies an estimated position in the 3-D point cloud of each of multiple keypoints.

In more detail, the training pose estimation neural network 258 in turn includes a fused representation processing neural network 252 ("sub neural network A") and an intermediate representation processing neural network 254 ("sub neural network B"). The fused representation processing neural network 252 is configured to process a network input including the fused representation to generate as output an intermediate representation 234 which can be in the form of a fixed-size multi-dimensional array of data values. The intermediate representation 234 is the output of the last layer of the training fused representation processing neural network 252 or a combination of the outputs of multiple layers of the training fused representation processing neural network 252. The intermediate representation processing neural network 254 is configured to process the intermediate representation 234 to generate the training pose estimation network output 264.

In some implementations, the training system 220 further includes a data point classification neural network 256 that is configured to process the intermediate representation 234 to generate a training data point classification network output 256 that classifies, for each of some or all of the data points included in the point cloud, whether or not a corresponding location of the data point matches (e.g., substantially overlaps) that of any one of the predetermined number of keypoints. Each of the neural networks 252-256 in turn can include one or more neural network layers.

While the fused representation processing neural network 252 and the intermediate representation processing neural network 254 are both included in the training pose estimation neural network 258, the data point classification neural network 256 is separate from the network 258 and therefore is not included in the pose estimation neural network 118 to be deployed on-board the vehicle 102. In other words, once deployed onboard the vehicle 102, the pose estimation neural network 118 is not configured to generate data point classification outputs. As will be explained in more detail below, the training system 220 uses the data point classification neural network 256 to improve the quality of the training process on the pose estimation task.

The training system 220 includes one or more computing devices having software or hardware modules that implement the operations of the training pose estimation neural network 258 and the data point classification network 256. For example, the training system 220 can include one or more computing devices having software or hardware modules that implement the respective operations of each layer of the training pose estimation neural network 258 according to an architecture of the training pose estimation neural network 258. The training pose estimation neural network 258 is generally the same network as the on-board pose estimation neural network 118. That is, the training pose estimation neural network 258 generally has the same architecture as the on-board pose estimation neural network 118 included in the perception subsystem 120.

At any given time during the training, the training system 220 can compute the operations of the training pose estimation neural network 258 using current values 228 of the set of neural network parameters 230 of the neural network 258.

The training system 220 trains the training pose estimation neural network 258 on training data that includes labeled images 214 from a labeled image dataset 204 and unlabeled point clouds 218 from an unlabeled point cloud dataset 208. The labeled images 214 and the unlabeled point clouds 218 may be paired with one another. That is, for each labeled image 214 included in the training data, the training data also includes a corresponding unlabeled point cloud which characterize a same scene of an environment as the image. Each pair of image and point cloud may be captured within a specified time window of one another and measure the same real-world region in the environment.

A labeled image is an image for which a known network output, e.g., a set of ground truth 2-D keypoint locations with respect to the image, is made available to the training system 220 according to the label information contained in the training data. An unlabeled point cloud is a point cloud for which information about a known network output, e.g., a set of ground truth 3-D keypoint locations with respect to the point cloud, is not specified by training data and is thus not readily available to the training system 220.

The training data may be obtained from data that is derived from real or simulated driving logs. A real driving log stores the raw sensor data that is continually generated by the sensor subsystem 104 on-board the vehicle 102 as the vehicle navigates through real-world environments. As described with reference to FIG. 1, the raw sensor data may be captured by one or more sensors of the vehicle, including one or more of: laser sensors, radar sensors, and camera sensors. A simulated driving log stores simulated sensor data. Simulated sensor data is generated by a software simulation of the environment. That is, the simulated sensor data simulates sensor data that would be generated by sensors of a vehicle.

To compensate for the absence of known network outputs associated with the unlabeled point cloud data 208, the training system 220 can automatically generate, e.g., by using a pseudo label generation engine or another component of the system, pseudo (or synthetic) labels for the unlabeled point clouds 218 based on information contained in the corresponding labeled images 214, i.e., based on both the images and the associated labels which define 2-D keypoint locations in the images. A first pseudo label generated in this way can define, for an unlabeled point cloud 218, respective 3-D pseudo keypoint locations in the point cloud and can be used as a target pose estimation network output during the training of the system. A second pseudo label generated in this way can define a pseudo classification for each of the plurality of data points in the unlabeled point cloud 218, where the pseudo classification specifies whether a corresponding data point should be classified as a keypoint or not. Generating pseudo labels is described in more detail below with reference to FIG. 7.

The training system 220 also includes a training engine 240 which computes, for each pair of labeled image 214 and unlabeled point cloud 218, a value of a first loss function that evaluates a measure of difference between a training pose estimation network output 264 and a target pose estimation network output, i.e., the first pseudo label that has been generated by the system for the unlabeled point cloud 218. For example, the first loss function may be a Huber loss or a mean squared error loss function that evaluates a difference between the values of respective 3-D keypoint locations specified by the training pose estimation network output 264 and the values of respective 3-D pseudo keypoint locations.

For each pair of labeled image 214 and unlabeled point cloud 218, the training engine 240 also computes a value of a second loss function that evaluates a measure of difference between the training data point classification network output 266 and a target data point classification output, i.e., the second pseudo label. The target data point classification output can be a binary classification that classifies, for each of some or all of the data points included in the point cloud, whether or not a corresponding location of the data point matches (e.g., substantially overlaps) that of any one of the predetermined number of keypoints. For example, the second loss function may be a sigmoid loss function that characterizes, for each data point included in the point cloud, whether the corresponding training classification is consistent with the target classification.

The training engine 240 can compute respective gradients for the first and second loss functions and generate updated neural network parameter values 238 by using an appropriate machine learning optimization technique, e.g., stochastic gradient descent or Adam. Specifically, the training engine 240 generates updated parameter values 238 for all three neural networks 252-256. The training engine 240 can then update the collection of neural network parameters 230 using the updated parameter values 238.

Additionally or alternatively, labeled (e.g., human-assigned) point cloud data may in fact be available to the system 220, e.g., in a limited volume. In such cases, the system can directly train the networks 252-256 by using the real 3-D keypoints specified by the labeled point clouds (or real pointwise classifications derived from the labeled point clouds) as target training outputs and without using any pseudo labels. For example, the training on labeled point cloud data can take place as a pre-training step, a fine-tuning step after the described training, or during the described training, e.g., in an interleaved manner.

After training is complete, the training system 220 can provide a set of trained parameter values 232 to the on-board system 100, e.g., by a wired or wireless connection. In particular, the training system 220 provides the trained parameter values 232 of the fused representation processing neural network and the intermediate representation processing neural network to the pose estimation neural network 118 included in the perception subsystem 120 for use in generating pose estimation outputs that enable the generation of timely and accurate planning decisions by the planning subsystem 130 of FIG. 1.

Figure 3:
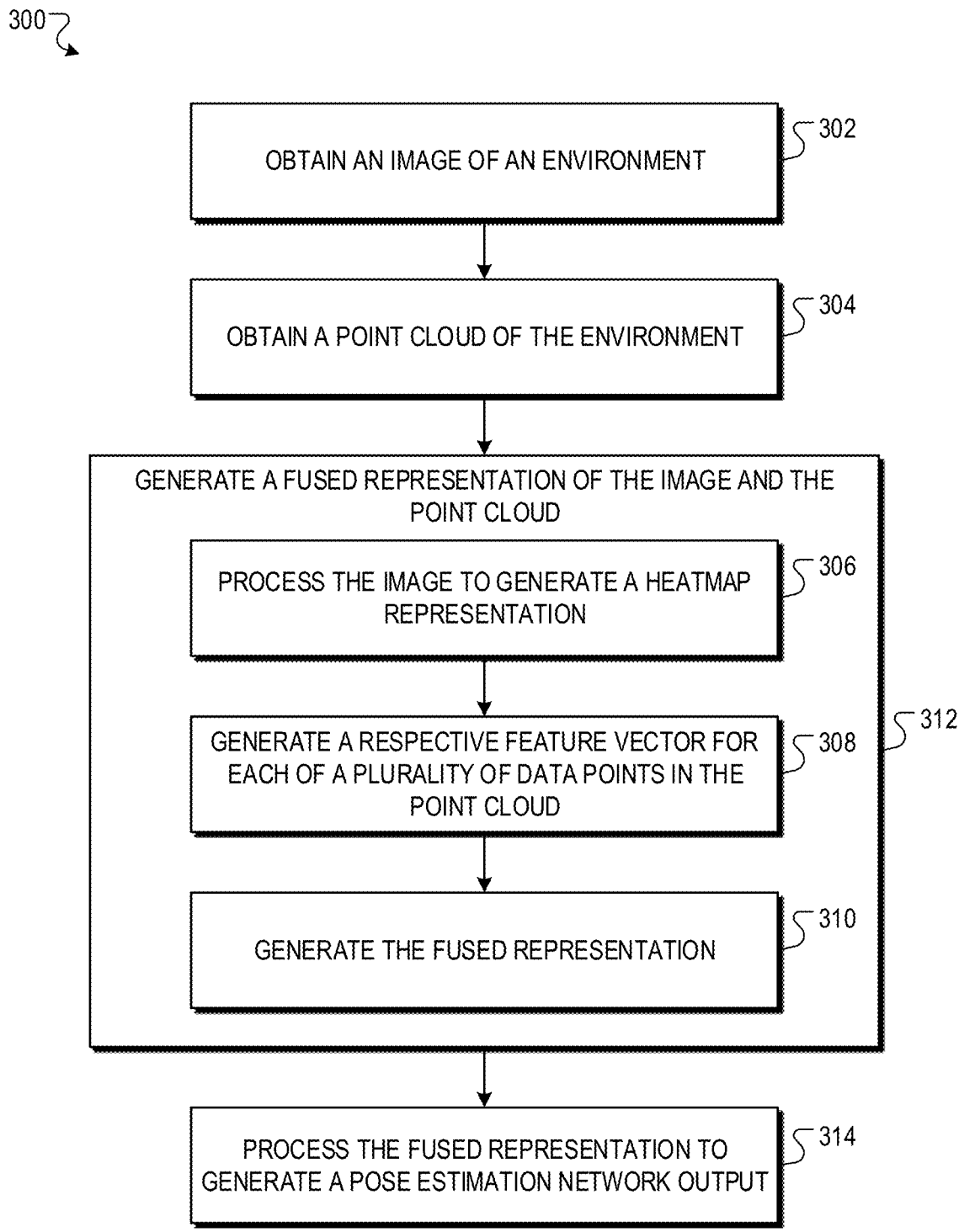
FIG. 3 is a flow diagram of an example process for generating a pose estimation network output.

FIG. 3 is a flow diagram of an example process 300 for generating a pose estimation network output. For convenience, the process 300 will be described as being performed by a system of one or more computers located in one or more locations. For example, a training system, e.g., the on-board system 100 of FIG. 1, appropriately programmed in accordance with this specification, can perform the process 300.

Briefly, the process 300 includes obtaining an image of an environment in a vicinity of a vehicle (302), obtaining a corresponding point cloud of the environment in the vicinity of the vehicle (304), generating a fused representation of the image and the point cloud (312), and processing the fused representation using a pose estimation neural network to generate a pose estimation network output (314). As described above, the pose estimation neural network in turn includes a fused representation processing neural network and an intermediate representation processing neural network.

In more detail, the system obtains an image of an environment (302). The image can be a camera image captured using a camera sensor of the vehicle that characterizes a scene of the environment surrounding the vehicle. The image can depict one or more objects, e.g., pedestrians, cyclists, or other vehicles, that are present in the scene of the environment.

The system obtains a corresponding point cloud of the environment (304). The point cloud can be a point cloud generated using a LIDAR sensor of the vehicle for the same scene of the environment that is characterized by the camera image. In this regard, the point cloud can identify a three-dimensional region within the environment surrounding the vehicle where the one or more objects may be located.

The system then performs the following steps 306-310 to generate the fused representation of the image and the point cloud.

The system processes the image using an already trained heatmap generation neural network in accordance with trained values of the heatmap generation network parameters to generate as output a heatmap representation of the image (306). The heatmap representation generally includes object pose information extracted or derived from the image by using the heatmap generation neural network.

In some implementations, the heatmap representation assigns, for each of a predetermined number of keypoints, a respective score to each of a plurality of locations (e.g., each of a plurality of locations corresponding to the pixels) in the image that represents a likelihood that the keypoint is located at the location in the image.

In some such implementations, the system can generate a respective heatmap for each of the predetermined number of keypoints. Each respective heatmap has a Gaussian peak at a respective estimated location for a given keypoint. In other words, in such implementations, the heatmap representation in turn includes a stack of multiple heatmaps that each have the same dimension (which may or may not be the same of that of the image) and that contains fixed-variance isotropic Gaussians around an estimated location of each of the predetermined number of keypoints.

The system generates, for each of some or all of the data points in the point cloud, a respective feature vector (308) that includes the respective scores for each of the plurality of keypoints for the location in the image that corresponds to the data point. For example, the system can determine the data points for which feature vectors should be generated with some measure of randomness, i.e., by randomly sampling a predetermined number of data points from all of the data points included in the point cloud.

To do so, the system can first project the data points in the point cloud onto an image coordinate frame to generate a projected point cloud representation. The projected point cloud representation is a 2-D representation that enables visualization of the 2-D location of each data point in the 3-D point cloud with respect to an image. For example, the system can degenerate the projected point cloud representation by computing a transformation between the 3-D coordinate frame adopted within the point cloud and the 2-D coordinate frame adopted within the image, and then applying the transformation to position vectors that represent the 3-D positions of the data points with respect to the point cloud. The system can then sample, for each of some or all of the data point in the point cloud, a corresponding feature vector from the heatmap representation, e.g., the stack of heatmaps.

Figure 6:
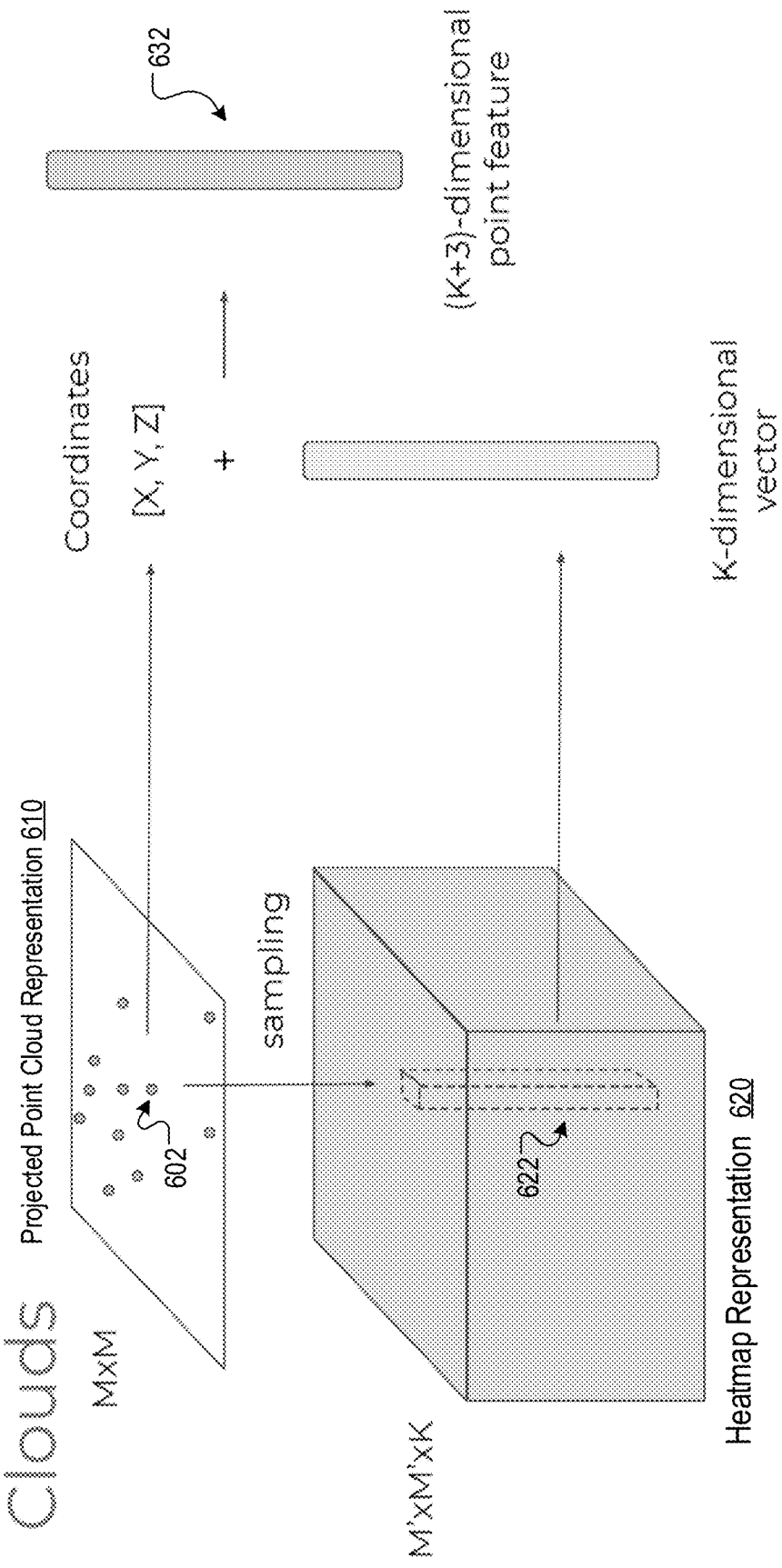
FIG. 6 illustrates an example process for generating a fused representation of image and point cloud.

FIG. 6 illustrates an example process for generating a fused representation of image and point cloud. As illustrated in the example of FIG. 6, the dimension of the projected point cloud representation 610 is M×M (which is the same as that of the camera image), and the dimension of the heatmap representation is M'×M'×K, where M is a width (or length) of the projected point cloud representation (or camera image), M' is the width (or length) of each heatmap included in the heatmap representation, and K is the predetermined number of keypoints. For each of some or all of the data points from the point cloud, e.g., data point 602, that has been projected onto the 2-D coordinate frame adopted within the camera image, the system can sample, from the heatmap representation 620, a corresponding feature vector 622 of dimension K.

The system generates a fused representation of the image and the point cloud (310), e.g., by, for each of the data points for which a feature vector was generated, computing a concatenation of the feature vector for the point and a vector specifying the three-dimensional location of the corresponding data point. The fused representation, also referred to as a multi-modal feature representation, can be a shared representation of object pose information derived from the camera image and data point location information contained in the point cloud. As illustrated in the example of FIG. 6, the sampled feature vector 622 is then concatenated with a vector specifying the three-dimensional location of the data point 602 to generate a portion of the fused representation 632.

The system processes the fused representation using the pose estimation neural network in accordance with trained values of the pose estimation network parameters to generate the pose estimation network output (314). The pose estimation network output can specify, for each of the plurality of keypoints, a respective estimated position in the three-dimensional region of the environment. For example, the pose estimation network output can define, for each of the plurality of keypoints, a three-dimensional location in the point cloud with reference to a point cloud coordinate frame. In various cases, the plurality of keypoints may collectively define a respective estimated pose of one or more objects in the environment.

Figure 4:
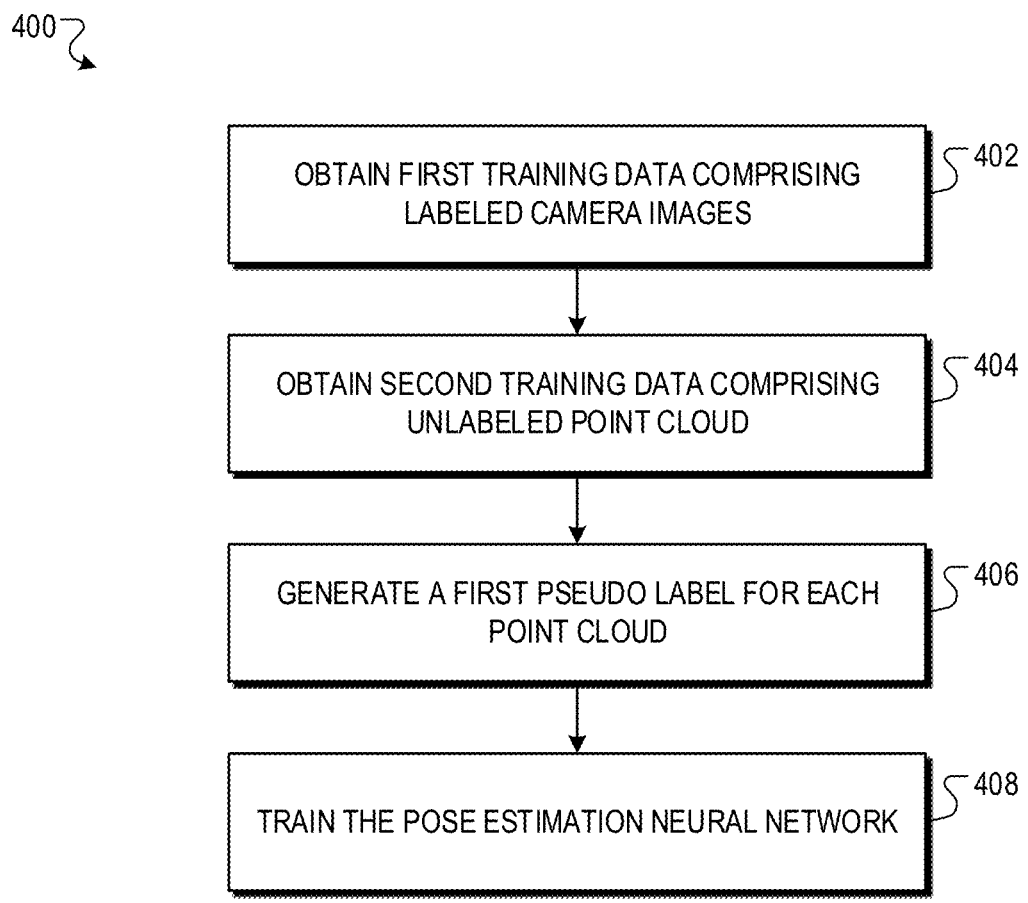
FIG. 4 is a flow diagram of an example process for training a pose estimation neural network.

FIG. 4 is a flow diagram of an example process 400 for training a pose estimation neural network. For convenience, the process 400 will be described as being performed by a system of one or more computers located in one or more locations. For example, a training system, e.g., the training system 220 of FIG. 2, appropriately programmed in accordance with this specification, can perform the process 400.

The system can repeatedly perform the process 400 for different training examples that each include a camera image and a corresponding point cloud in order to train the pose estimation neural network by repeatedly updating the values of the network parameters.

The system obtains first training data including a labeled image (402). A labeled image is an image for which a known network output, e.g., a set of ground truth 2-D keypoint locations with respect to the image, is made available to the system according to the label information contained in the training data.

The system obtains second training data including an unlabeled point cloud (404). An unlabeled point cloud is a point cloud for which information about a known network output, e.g., a set of ground truth 3-D keypoint locations with respect to the point cloud, is not specified by training data and is thus not readily available to the system.

The system can receive the training data including the labeled image and unlabeled point cloud in any of a variety of ways. For example, the system can receive training data as an upload from a remote user of the system over a data communication network, e.g., using an application programming interface (API) made available by the system. As another example, the system can receive an input from a user specifying which data that is already maintained by the system should be used as the training data.

The system generates, for the unlabeled point cloud and based on the plurality of ground truth 2-D keypoint locations in the image, a first pseudo label that specifies a plurality of pseudo keypoint locations in the point cloud (406). Specifically, the first pseudo label defines, for the point cloud, respective 3-D pseudo keypoint locations in the point cloud that can be used as a target pose estimation network output during the training of the system. The first pseudo label can be derived from the information contained in the corresponding labeled image, i.e., from both the image and the associated label which define 2-D keypoint locations in the image.

Figure 7:
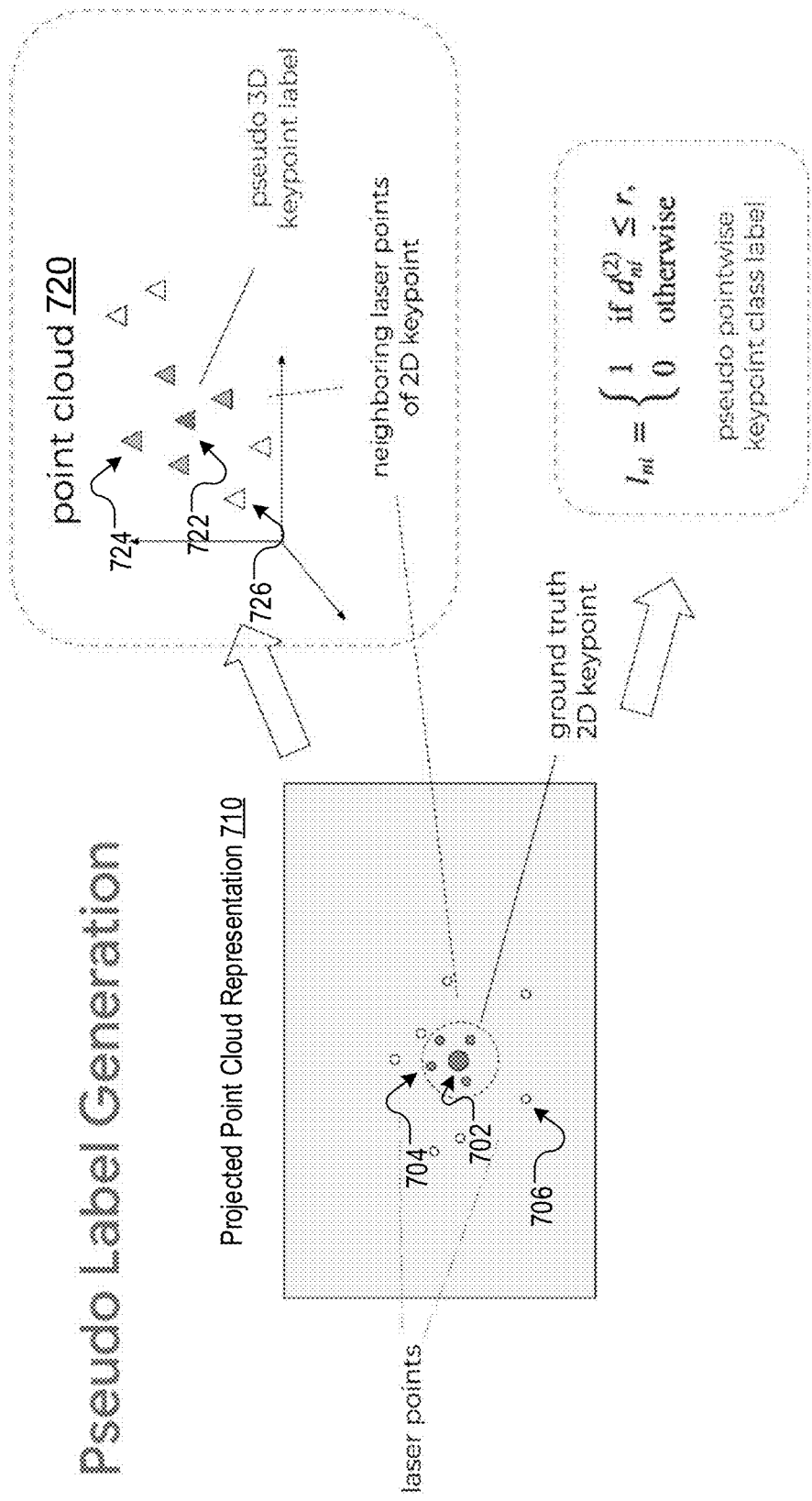
FIG. 7 illustrates an example process for generating a pseudo label for a point cloud.
Like reference numbers and designations in the various drawings indicate like elements.

FIG. 7 illustrates an example process for generating a pseudo label for a point cloud. The system can project each of the plurality of ground truth 2-D keypoints in the image, e.g., 2-D keypoint 702, onto a point cloud coordinate frame to determine the corresponding 3-D locations of the projected keypoints in the point cloud 720, e.g., projected keypoint 722. For example, the system can do so by computing a transformation between a 2-D coordinate frame adopted within the image and a 3-D coordinate frame adopted within the point cloud, and then applying the transformation to the position vectors that represent the ground truth 2-D keypoints with respect to the image.

In a similar manner, the system also generates, for the unlabeled point cloud and based on the plurality of ground truth keypoint locations in the image, a second pseudo label that specifies a ground truth classification for each of the plurality of data points in the point cloud. Specifically, the second pseudo label is a pseudo pointwise classification label that specifies whether a corresponding data point in the point cloud should be classified as a keypoint or not. The second pseudo label can be derived from the information contained in the corresponding labeled image in accordance with a predetermined, e.g., user-specified, distance criteria.

As illustrated in FIG. 7, the system can determine, from projected point cloud representation 710, whether each of the projected data points is within a threshold distance r, e.g., in terms Euclidean distance, to any one of the ground truth 2-D keypoints. For a projected data point, e.g., projected data point 704, that has been determined to be located within the threshold distance to a ground truth 2-D keypoint, e.g., ground truth 2-D keypoint 702, in the projected point cloud representation, the system can then generate a second pseudo specifying the corresponding data point in the point cloud (the data point which has been projected onto the image coordinate frame to generate the projected data point), e.g., data point 724, should be classified as a keypoint.

In this way, the system can assign positive pseudo classification labels to a subset of the plurality of data points corresponding to the projected data points that are each within a threshold distance to any of the plurality of ground truth 2-D keypoint locations and, correspondingly, negative pseudo classification labels to remaining data points in the point cloud, e.g., data point 726 corresponding to the projected data point 706, that are not included in the subset.

The system then proceeds to iteratively (i.e., at each of multiple training iterations) determine updated values of the neural network parameters by training the pose estimation neural network (408) that includes (i) the fused representation processing neural network and (ii) the intermediate representation processing neural network on the task of object pose estimation in point cloud, and by additionally training (i) the fused representation processing neural network together with (ii) a data point classification neural network on an auxiliary task of pointwise classification of the point cloud.

In more detail, at each training iteration, the system processes, by using the fused representation processing neural network and in accordance with current values of the fused representation processing network parameters, an network input including a fused representation to generate as output an intermediate representation of the network input, e.g., in form of a fixed-size multi-dimensional array of data values, e.g., as an embedding of the network input. The fused representation of the image and the point cloud can be generating using techniques similarly described above with reference to FIGS. 3 and 6. The system then processes, by using the intermediate representation processing neural network and in accordance with current values of the intermediate representation processing network parameters, the fused representation to generate as output a training pose estimation network output. The training pose estimation network output specifies, for each of the predetermined number of keypoints, a predicted 3-D position in the unlabeled point cloud.

The system computes a first loss based on a difference between the training pose estimation network output and the target pose estimation network output, i.e., the first pseudo label. For example, the first loss function may be a Huber loss or a mean squared error loss function that evaluates a difference between the values of respective predicted 3-D keypoint locations specified by the training pose estimation network output and the values of respective 3-D pseudo keypoint location.

The system also processes, by using the data point classification neural network and in accordance with current values of the data point classification network parameters, the intermediate representation to generate a training data point classification network output. The training data point classification network classifies, for each of some or all of the data points included in the unlabeled point cloud, whether or not a corresponding location of the data point matches (e.g., substantially overlaps) that of any one of the predetermined number of 3-D pseudo keypoints.

The system computes a second loss based on a difference between the training data point classification network output and the target data point classification network output, i.e., the second pseudo label. For example, the second loss function may be a sigmoid loss function that characterizes, for each data point included in the point cloud, whether the corresponding training classification is consistent with the target classification.

At the end of each iteration, the system uses respective gradients computed for the first and second loss functions to determine the updates to parameter values of neural network. More specifically, the system can compute a gradient of the first loss with respect to the intermediate representation processing network parameters, and a gradient of the second loss with respect to the data point classification network parameters.

The system backpropagates the computed gradient of the first loss through the intermediate representation processing network parameters into the fused representation processing network parameters to determine the update to the current parameters values of (i) the intermediate representation processing neural network and (ii) the fused representation processing neural network.

The first loss, i.e., a difference loss, trains the pose estimation neural network, i.e., trains the fused representation processing neural network and the intermediate representation processing neural network altogether, to more accurately generate pose estimation network outputs.

The system similarly backpropagates the computed gradient of the second loss through the data point classification network parameters into the fused representation processing network parameters to determine the update to the current parameters values of (i) the data point classification neural network and (ii) the fused representation processing neural network.

The second loss, i.e., a classification loss, trains the data point classification neural network to more accurately generate data point classification outputs and, by virtue of backpropogation, the fused representation processing neural network to generate to generate more robust (e.g., more accurate, informative, or both) intermediate representations that, in turn, facilitates the intermediate representation processing neural network to further more accurately generate pose estimation network outputs.

The system then proceeds to apply the determined updates to the current parameter values of the neural networks using an appropriate machine learning optimization technique (e.g., stochastic gradient descent or Adam). Alternatively, the system only proceeds to update the current parameter values once multiple training iterations have been performed for an entire mini-batch of training examples. A mini-batch generally includes a fixed number of training examples, e.g., 16, 64, or 256. In other words, the system combines, e.g., by computing a weighted or unweighted average of, respective updates that are determined during the fixed number of training iterations and proceeds to update the current parameter values based on the combined update.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, wherein the method comprises:
    generating a fused representation of an image of an environment and a point cloud of a three-dimensional region of the environment, wherein the point cloud comprises a plurality of data points, and wherein the generating comprises:
        generating, based on the image and for each of a plurality of keypoints, a score for each of a plurality of locations in the image that represents a likelihood that the keypoint is located at the location in the image; and
        generating, for each of the plurality of data points in the point cloud, a respective feature vector that includes at least some of the scores generated based on the image;
    processing the fused representation to generate, for each of the plurality of keypoints, an estimated position in the three-dimensional region of the environment; and
    controlling an agent based at least on the estimated position for each of the plurality of keypoints.

2. The method of claim 1, wherein controlling the agent based at least on the estimated position for each of the plurality of keypoints comprises:
    generating, based at least on the estimated position for each of the plurality of keypoints, a planning decision for the agent; and
    controlling the agent to implement the planning decision by transmitting one or more electronic signals that have been generated in accordance with the planning decision to one or more control units of the agent.

3. The method of claim 1, wherein the agent comprises a vehicle, and wherein the environment is an environment in a vicinity of the vehicle.

4. The method of claim 1, wherein the plurality of keypoints collectively define an estimated pose of each of one or more pedestrians in the environment.

5. The method of claim 3, wherein the vehicle comprises an autonomous vehicle, or a semi-autonomous vehicle.

6. The method of claim 2, wherein the planning decision plans a future trajectory of the vehicle.

7. The method of claim 1, wherein the agent comprises a robot.

8. The method of claim 1, wherein processing the fused representation to generate the estimated position in the three-dimensional region of the environment comprises:
processing the fused representation using a pose estimation neural network that has been trained on training data comprising both (i) labeled point cloud data that associates each of multiple point clouds with corresponding human assigned keypoints and (ii) unlabeled point cloud data for which human assigned keypoints are unavailable.

9. A system comprising one or more computers and one or more storage devices storing instructions that, when executed by the one or more computers, cause the one or more computers to perform operations comprising:
generating a fused representation of an image of an environment and a point cloud of a three-dimensional region of the environment, wherein the point cloud comprises a plurality of data points, and wherein the generating comprises:
generating, based on the image and for each of a plurality of keypoints, a score for each of a plurality of locations in the image that represents a likelihood that the keypoint is located at the location in the image; and
generating, for each of the plurality of data points in the point cloud, a respective feature vector that includes at least some of the scores generated based on the image;
processing the fused representation to generate, for each of the plurality of keypoints, an estimated position in the three-dimensional region of the environment; and
controlling an agent based at least on the estimated position for each of the plurality of keypoints.

10. The system of claim 9, wherein controlling the agent based at least on the estimated position for each of the plurality of keypoints comprises:
generating, based at least on the estimated position for each of the plurality of keypoints, a planning decision for the agent; and
controlling the agent to implement the planning decision by transmitting one or more electronic signals that have been generated in accordance with the planning decision to one or more control units of the agent.

11. The system of claim 9, wherein the agent comprises a vehicle, and wherein the environment is an environment in a vicinity of the vehicle.

12. The system of claim 9, wherein the plurality of keypoints collectively define an estimated pose of each of one or more pedestrians in the environment.

13. The system of claim 11, wherein the vehicle comprises an autonomous vehicle, or a semi-autonomous vehicle.

14. The system of claim 10, wherein the planning decision plans a future trajectory of the vehicle.

15. The system of claim 9, wherein the agent comprises a robot.

16. The system of claim 9, wherein processing the fused representation to generate the estimated position in the three-dimensional region of the environment comprises:
processing the fused representation using a pose estimation neural network that has been trained on training data comprising both (i) labeled point cloud data that associates each of multiple point clouds with corresponding human assigned keypoints and (ii) unlabeled point cloud data for which human assigned keypoints are unavailable.

17. One or more non-transitory computer-readable storage media storing instructions that when executed by one or more computers cause the one or more computers to perform operations comprising:
generating a fused representation of an image of an environment and a point cloud of a three-dimensional region of the environment, wherein the point cloud comprises a plurality of data points, and wherein the generating comprises:
generating, based on the image and for each of a plurality of keypoints, a score for each of a plurality of locations in the image that represents a likelihood that the keypoint is located at the location in the image; and
generating, for each of the plurality of data points in the point cloud, a respective feature vector that includes at least some of the scores generated based on the image;
processing the fused representation to generate, for each of the plurality of keypoints, an estimated position in the three-dimensional region of the environment; and
controlling an agent based at least on the estimated position for each of the plurality of keypoints.

18. The non-transitory computer-readable storage media of claim 17, wherein controlling the agent based at least on the estimated position for each of the plurality of keypoints comprises:
generating, based at least on the estimated position for each of the plurality of keypoints, a planning decision for the agent; and
controlling the agent to implement the planning decision by transmitting one or more electronic signals that have been generated in accordance with the planning decision to one or more control units of the agent.

19. The non-transitory computer-readable storage media of claim 17, wherein the agent comprises a vehicle, and wherein the environment is an environment in a vicinity of the vehicle.

20. The non-transitory computer-readable storage media of claim 17, wherein the plurality of keypoints collectively define an estimated pose of each of one or more pedestrians in the environment.

* * * * *